US008861017B2

(12) United States Patent
O'Brien-Strain

(10) Patent No.: US 8,861,017 B2
(45) Date of Patent: Oct. 14, 2014

(54) WEB WIDGET FIR FORMATTING WEB CONTENT

(75) Inventor: Eamonn O'Brien-Strain, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 54 days.

(21) Appl. No.: 13/501,294

(22) PCT Filed: Nov. 20, 2009

(86) PCT No.: PCT/US2009/065369
§ 371 (c)(1),
(2), (4) Date: Apr. 11, 2012

(87) PCT Pub. No.: WO2011/062589
PCT Pub. Date: May 26, 2011

(65) Prior Publication Data
US 2012/0268795 A1 Oct. 25, 2012

(51) Int. Cl.
*G06K 15/00* (2006.01)
*G06Q 30/02* (2012.01)
*G06F 17/21* (2006.01)
*H04N 1/60* (2006.01)

(52) U.S. Cl.
CPC ............. *G06F 17/211* (2013.01); *G06Q 30/02* (2013.01)
USPC ............................ 358/1.18; 358/1.15; 358/1.9

(58) Field of Classification Search
CPC ........... H04N 1/60; H04N 1/50; G06K 15/00; G06K 1/00
See application file for complete search history.

(56) References Cited

U.S. PATENT DOCUMENTS

| | | | |
|---|---|---|---|
| 2002/0135806 A1* | 9/2002 | Yoshino | 358/1.15 |
| 2004/0105127 A1 | 6/2004 | Cudd et al. | |
| 2005/0099647 A1* | 5/2005 | Aichi | 358/1.15 |
| 2007/0143670 A1 | 6/2007 | Stevenson | |
| 2009/0021790 A1* | 1/2009 | Krovitz et al. | 358/1.18 |

FOREIGN PATENT DOCUMENTS

| | | |
|---|---|---|
| JP | 2005209196 | 8/2005 |
| JP | 2007027069 | 10/2007 |
| KR | 10-2008-0030328 | 4/2008 |

* cited by examiner

*Primary Examiner* — Firmin Backer
*Assistant Examiner* — Henok A Shiferaw

(57) ABSTRACT

A method for formatting website content for printing includes providing a web widget to a user's computer. Content from a website viewable on the user's computer can be analyzed and extracted via an application server engaged by the web widget. The extracted content can be transformed into a desired format on the application server.

17 Claims, 4 Drawing Sheets

WEB WIDGET FIR FORMATTING WEB CONTENT

BACKGROUND

Many people do not have the inclination to print what they see on their computer screen when they are surfing the Internet. This antipathy often occurs from frustration at trying to get a useful printed version of a web site. In fact, printing most web pages often amounts to sending the web site to the printer page by page, which results in printing everything on the web page, including unwanted material such as hyperlinks, advertising, navigation, and the like.

Some web sites and programs attempt to assist a user in formatting the site to a more printer friendly version. For example, there are some browser-side solutions that generally take a single page and resize it to fit a printed page or allow interactive selection of various parts of the page to be printed. Additionally, there are a number of server-side HTML solutions such as ad-hoc "printer friendly" pages that use resources provided by the publishing web site to present an alternative formatting of a single page, or sometimes of multiple web pages comprising a single article. However, it can be desirable to transform multiple web pages for printing, while also providing a proactive, animated print preview that encourages such printing.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein.

DETAILED DESCRIPTION

Figure 1:
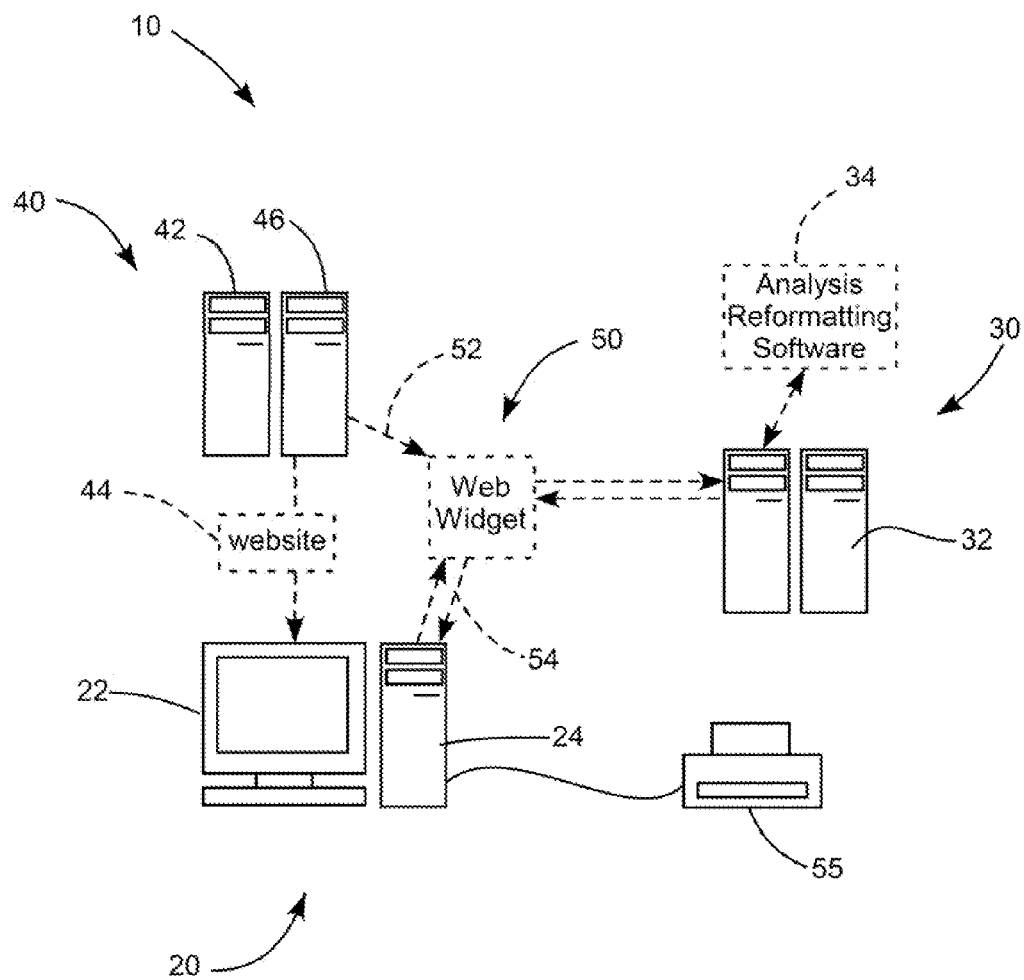
FIG. 1 is a schematic view of a system for transforming website content into a desired print format in accordance with an embodiment of the present disclosure.

Reference will now be made to exemplary embodiments illustrated in the drawings, and specific language will be used herein to describe the same. It will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure.

As used herein, directional terms, such as "top," "bottom," "front," "back," "leading," "trailing," etc, are used with reference to the orientation of the figures being described. Because components of various embodiments disclosed herein can be positioned in a number of different orientations, the directional terminology is used for illustrative purposes only, and is not intended to be limiting.

As used herein, the term "computer" refers to any type of computing device, including a personal computer, mainframe computer, portable computer, PDA, smart phone, or workstation computer that includes a processing unit, a system memory, and a system bus that couples the processing unit to the various components of the computer. The processing unit can include one or more processors, each of which may be in the form of any one of various commercially available processors. Generally, each processor receives instructions and data from a read-only memory (ROM) and/or a random access memory (RAM). The system memory typically includes ROM that stores a basic input/output system (BIOS) that contains start-up routines for the computer, and RAM for storing computer program instructions and data.

A computer typically also includes input devices for user interaction (e.g., entering commands or data, receiving or viewing results), such as a keyboard, a pointing device (e.g. a computer mouse), microphone, camera, or any other means of input known to be used with a computing device. The computer can also include output devices such as a monitor or display, projector, printer, audio speakers, or any other device known to be controllable by a computing device. In some embodiments, the computer can also include one or more graphics cards, each of which is capable of driving one or more display outputs that are synchronized to an internal or external clock source.

The term "computer program" is used herein to refer to machine-readable instructions, stored on tangible computer-readable storage media, for causing a computing device including a processor and system memory to perform a series of process steps that transform data and/or produce tangible results, such as a display indication or printed indicia.

The terms "computer-readable media" and "computer-readable storage media" as used herein includes any kind of memory or memory device, whether volatile or non-volatile, such as floppy disks, hard disks, CD-ROMs, flash memory, read-only memory, and random access memory, that is suitable to provide non-volatile or persistent storage for data, data structures and machine-executable instructions. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and optical disks, such as CD, CDROM, DVD-ROM, DVD-RAM, and DVD-RW. Any of the above types of computer-readable media or related devices can be associated with or included as part of a computer, and connected to the system bus by respective interfaces. Other computer-readable storage devices (e.g., magnetic tape drives, flash memory devices, and digital video disks) also may be used with the computer.

As used herein, the term "web widget" refers to a portable portion of code or program that can be installed and executed within a separate HTML-based web page by an end user without requiring additional compilation. For example, a web widget can be a downloadable DHTML, JavaScript, or Adobe Flash program that can be embedded within an HTML page, such as a web page. A web widget can add some content to a web page that is not static, and can provide additional functions to a web page. In some cases, depending on how the widget is loaded into the web browser, the widget can access and modify the web page in which the widget is embedded. A web widget can include downloadable applications which look and act like a traditional application but are implemented using web technologies including Adobe Flash, Java, JavaScript, HTML and CSS. Web widgets use and depend on web application program interfaces (APIs) exposed either by the browser or by a widget engine.

As used herein, the term "client-side" refers to computer operations that are performed by a client in a client-server relationship. A client can be a computer application, such as a web browser, that runs on a user's local computer, such as a mobile phone, laptop, or workstation, and connects to a computer server as necessary. A server can be any combination of hardware or software designed to provide services to clients such as a computer which may be running a web application capable of providing services.

The exemplary embodiments described herein generally provide for a system and method for printing a website's content in a desired format, such as a magazine layout, newspaper layout, photo-album layout; and the like, which can be considered more readable. The system provides a background application and a user interface in the form of a client-side web widget deliverable to a website page in such a way as to entice a user to look at and print an alternative format of the website content. When activated, the web widget accesses an independent application server that can analyze the pages of the website for desirable printable content. The analysis identifies and extracts undesirable content such as hyperlinks, meta-tags, advertisements, and other activatable content such as navigation controls, and the like. The remaining content of the website can then be formatted for printing in a desired format such as a magazine, photo-album, newsprint, brochure, and the like. The formatted content can then be displayed to the user as a miniature animated icon on the website page so as to encourage the user to view and print the reformatted website content.

Provided in FIG. 1 is a schematic view of one embodiment of a system for transforming website content into a desired print format, indicated generally at 10. The system 10 can include a user computer, indicated generally at 20, an application server, indicated generally at 30, a web server, indicated generally at 40, and a web widget software application or program, indicated generally at 50.

The user computer 20 can be a network enabled personal computer, such as an Internet ready desktop computer 22, laptop computer, notebook computer, netbook computer, mobile phone, and the like. The user computer can include a processor 24 having software comprising computer-readable programming instructions stored on tangible computer-readable storage media that can enable and provide access to content on websites on the web server 40. In this way, the user computer can access content from a remote third party network enabled computer server such as the web server 40.

The application server 30 can be a network enabled computer server having a processor 32 with software program applications comprising computer-readable programming instructions stored on tangible computer-readable storage media that can serve client servers, such as the web server 40, and client computers, such as the user computer 20. In one embodiment, the application server can include a software program 34 that can analyze, extract and reformat select content of websites into a desired print format.

More specifically, the application server 30 can have a program 34 that can analyze the content of a website 22 to identify desirable and undesirable print content of the website. The undesirable print content can be separated from the desirable content, and the desirable content can be transformed and reformatted into a desired print format.

It will be appreciated that the parameters for identifying what content is desirable or undesirable can be defined by a user. For example, a user may define undesirable content as hyperlinks, meta-tags, advertisements, and other activatable content, such as navigation controls, and the like, that would appear meaningless in a printed hardcopy format. The undesirable content can be removed from the web page and the remaining content of the website can then be formatted for printing in a desired format.

The desired print content can also be defined by the user and can include digital images, text, graphics and the like. The desired print content can be formatted into a commonly used format for printed information such as a magazine layout, a newspaper layout, a photo album, a brochure, a book, a booklet, a leaflet, and the like.

The web server 40 can be a network enabled computer server 42 that can provide content to the user computer in the form of a website 44. The web server can include a processor 46 with software comprising computer-readable programming instructions stored on tangible computer-readable storage media that can organize and make web content available to users. In one aspect, the web server can be part of a closed intranet network that is accessible only to other members of the intranet. In another aspect, the web server can be networked to the Internet and available to all Internet users through the World Wide Web.

The web widget 50 can be a portable software module that can be accessible by the processor 24 of the user computer 20. The web widget can engage the application server 30 when activated by the user computer in order to extract and analyze content of websites viewed by the user computer. The application server can also reformat select content from the website 44 into a desired print format.

Figure 2:
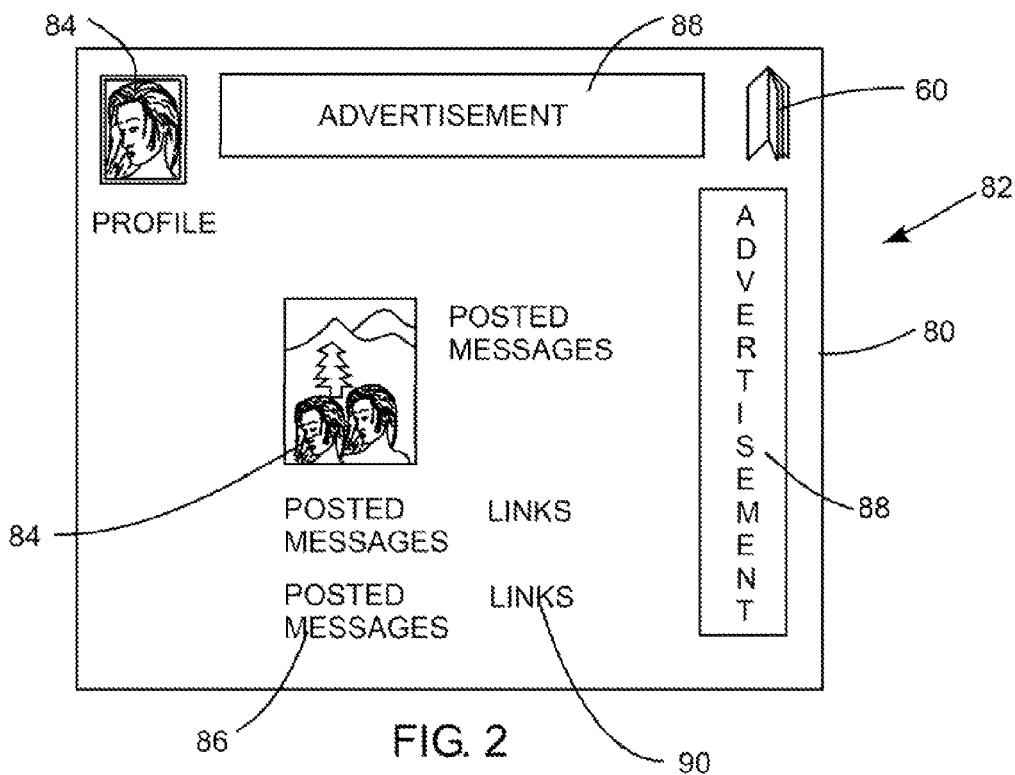
FIG. 2 is a schematic view of a web widget on a website page in accordance with an embodiment of the present disclosure.

In one embodiment, the web widget 50 can be a client-side web widget that resides on the web server 40, as shown by dashed line 52, and is delivered to the user computer 20 with the website 44 from the web server. In another embodiment, the web widget can be a client-side web widget that resides on the user computer, as shown by dashed line 54. In this case the web widget can be a plug-in program operable with an Internet browser on the user computer. In either case, the web widget can be accessible through an icon 60 displayable on the user computer, as shown in FIG. 2. Advantageously, with typical web browsers, both of these embodiments for providing a web widget to run inside a web page bypass the security barriers that otherwise prevent a web widget from accessing or modifying its host web page.

Figure 3:
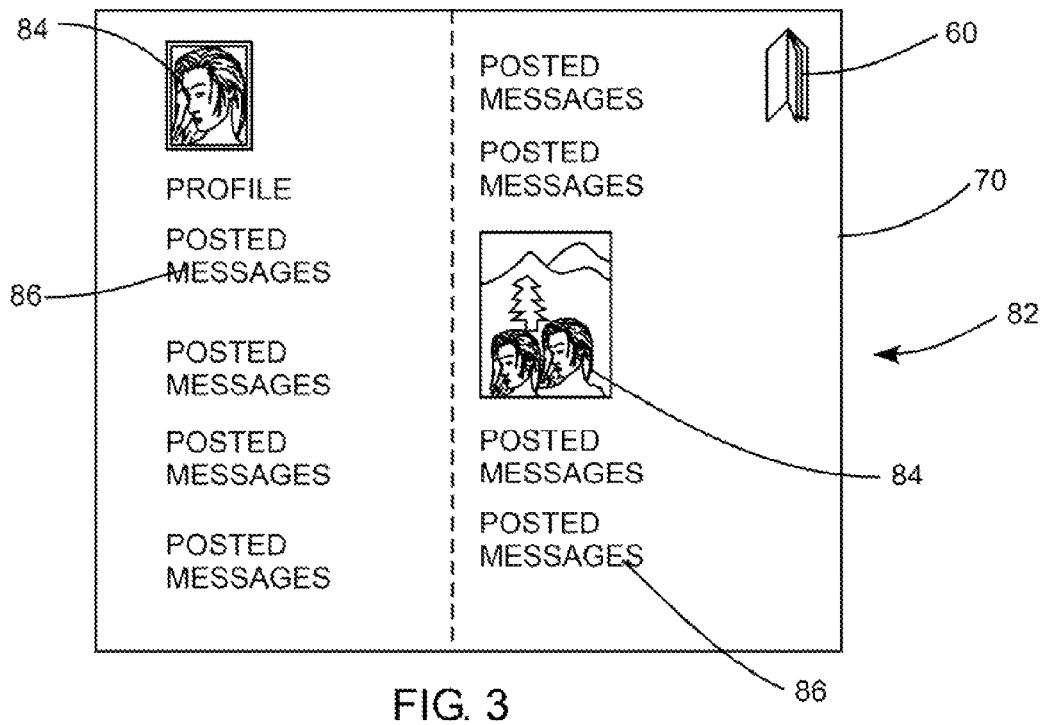
FIG. 3 is a schematic view of a preview page of the content of the website page of FIG. 2, shown reformatted to a magazine layout format for printing in accordance with an embodiment of the present disclosure.

Referring to FIGS. 2-3, FIG. 2 is a schematic view of a web widget 50 on a website page 80. The website page can have content, indicated generally at 82. Some of the content can be desirable content such as digital images 84 and text 86, and some of the content can be undesirable content such as advertisements 88 and hyperlinks 90. FIG. 3 is a schematic view of a preview page 70 of the content 82 of the website page of FIG. 2. The preview page can show the content in a formatted layout suitable for printing such as a magazine layout, as shown in FIG. 3.

The web widget 50 can provide a preview 70 of the reformatted website content 82. The preview can also be accessed by the user computer 20 through the icon 60. The icon can be designed with an appearance and configuration so as to entice the user to click the icon in order to view the preview. For example, the icon can be an animated gif that can attract the gaze of the user so as to encourage the user to activate the web widget by clicking on the animated icon.

The icon 60 can also be configured to encourage the user to print the reformatted website 70. The reformatted website can be output to a display device such as a computer screen or a hard copy of the reformatted website content can be printed by a printer device (55 in FIG. 1) coupled to the user computer (20 in FIG. 1). Additionally, the reformatted website can be sent across a network for printing in a central location and later collected by the user at a retail location or delivered by mail. Advantageously, encouraging and enticing the user to print the formatted content can increase sales of the printers and printer supplies and the use of printing services.

Referring to FIGS. 1-3, in use, a user can activate the user computer 20 and can connect with the Internet to browse websites. In one embodiment, a website server 40, that provides a website for viewing by client computers such as the user computer, can have a web widget 50 embedded in the content of the website. The web widget can engage a program on an application server 30 that can analyze the website for desirable and undesirable content. The program on the application server can select the desirable website content and format the desirable content into a desired print format.

In another embodiment, the web widget 50 can be added to a web browser that is resident on the user computer 20. For example, the web widget can include a plug-in software application that can be added to the web browser on the user computer. The web widget can engage the program on the application server 30 to analyze and reformat content from any website viewed by the user computer.

In either of the embodiments mentioned above, the analysis can be performed by the application server 30 in the background while the user is navigating the website. When the analysis is complete, the icon 60 can be presented on the user computer 20, either as part of the website 44 or as part of the browser on the user computer. The icon can display a preview 70 of the reformatted website content. Both the icon and the preview can be configured to be aesthetically pleasing to a user so as to entice the user to print the reformatted web content.

Figure 4:
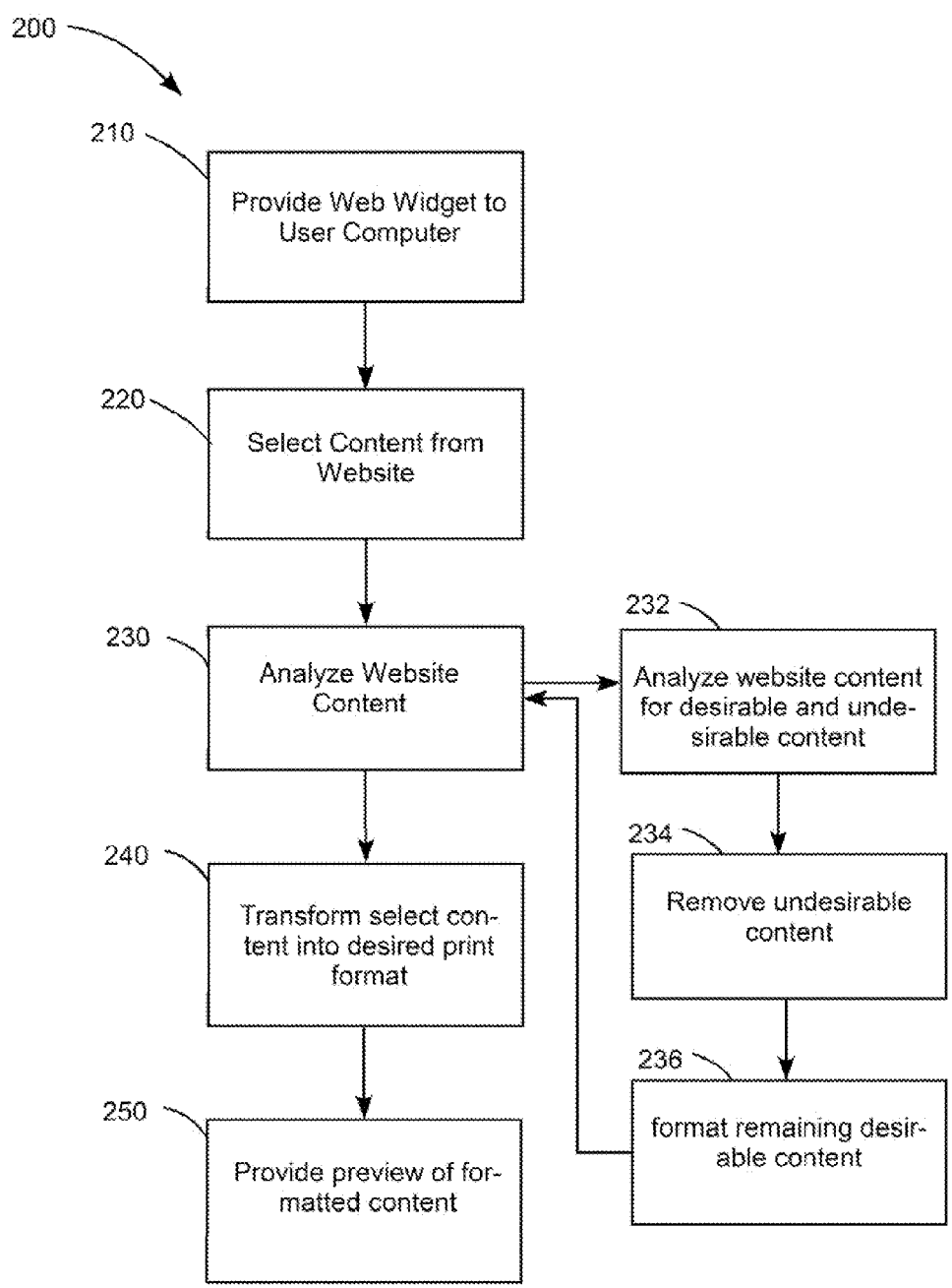
FIG. 4 is a flow chart of a method for formatting website content for printing in accordance with an embodiment of the present disclosure.

Provided in FIG. 4 is a flow chart outlining the steps in one embodiment of a method for formatting website content for printing, indicated generally at 200. The method can be carried out by a computer system having a processor and a system memory. The method can include providing a web widget to a user's computer, as shown at 210. Select content from a website that is viewable on the user's computer can be extracted from the website, as shown at 220. The content can be analyzed by an application server that can be engaged by the web widget, as shown at 230. The select content can be transformed into a desired print format on the application server, as shown at 240.

The method also includes providing a preview of the formatted content to the user's computer with the preview being accessible through the web widget, as shown at 250. For example, the web widget can display an icon on the user's computer with the icon being configured to entice the user to access the preview and output the reformatted website.

Additionally, the formatted content of the website can be printed on a printer when directed by the user's computer through the icon of the web widget displayed on the user's computer.

In one embodiment, the web widget can be provided to the user computer from the website server that provides the website viewable on the user's computer. Advantageously, in this way the producer of the website can provide a service to the users viewing the website, while at the same time promoting the website.

In another embodiment, the web widget can be provided to the user computer by supplying the web widget to the user computer as a plug-in program operable with an Internet browser resident on the user's computer. In this way, the web widget can be available for any website viewed by the user computer.

The step of extracting select content can also include analyzing content of the website with a software program comprising computer-readable programming instructions stored on tangible computer-readable storage media and executable by a processor on the application server, as shown at 232. The program can analyze the content of the website to identify desirable and undesirable print content of the website. The undesirable print content can be extracted from the website content by the program on the processor of the application server, as shown at 234. The remaining desirable content can then be formatted into a desired print format via the processor, as shown at 236.

Figure 5:
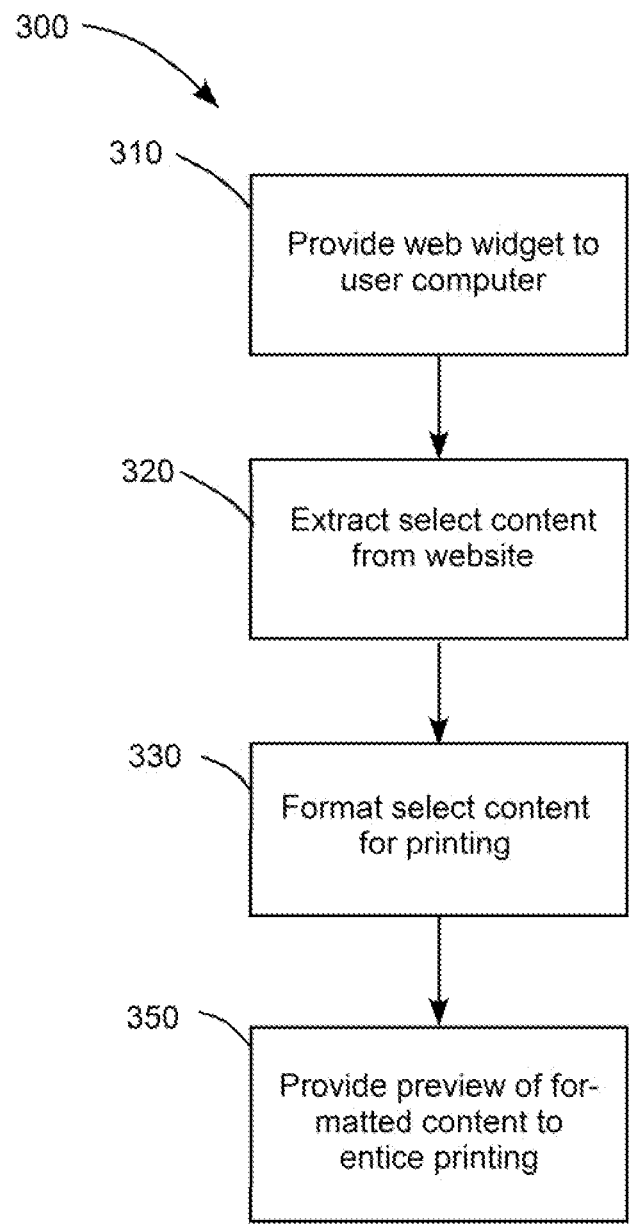
FIG. 5 is a flow chart of an embodiment of a method for promoting printing of website content.

Provided in FIG. 5 is a flow chart outlining the steps in one embodiment of a method for promoting printing of website content, indicated generally at 300. The method can be carried out by a computer system having a processor and a system memory. The method can include providing a web widget to a user computer, as shown at 310. Select content can be extracted from a website viewable on the user computer, as shown at 320. The select content can be formatted into a desired print format via an application server engaged by the web widget, as shown at 330. A preview of the formatted content can be provided to the user computer via the web widget, as shown at 340.

The method also includes providing a preview of the formatted content, such as by displaying an icon on the user's computer, as shown at 350. The icon can be a part of the web widget and can have an appearance and configuration to entice the user to access the preview of the formatted content and to print the reformatted website.

Thus, in summary, and by way of an exemplary scenario, a user can visit a web site, and see an animated icon that displays a miniature version of a website displayed as an animated magazine with pages that turn. The icon can be a web widget that presents a user interface and has a design that attracts the user's attention and encourages the user to click on the icon. When the icon is selected the user is presented with a choice of method for printing a hard copy version of the current website.

Advantageously, the web widget can reformat personalized web sites such as social networking sites that allow a user to upload and display digital images and news related to or of interest to the user, friends, and family. In this way, the social networking website can be reformatted into an aesthetically pleasing layout suitable for printing as a hard copy magazine, book, and the like.

The web widget can be implemented in a website friendly programming code such as JavaScript or Flash. The web widget can send a representation of the web site pages to a preview page generation module, and receive back reformatted layout pages that can be displayed to the user. The user can then request the preview representation be sent to a final page generation module.

The preview page generation module can create an approximate, low fidelity layout of the web site as a sequence of pages. In one embodiment, the preview page can be executed on a web server. In another embodiment, the preview page can be executed in the client browser. Advantageously, executing the preview page in the client browser can avoid sending possible private information to a publicly accessible server without explicit action by the user.

The final page generation module can create a version of the website that is suitable for printing in a variety of formats including a magazine layout, a newspaper layout, a photo album, a brochure, a book, a booklet, a leaflet, and the like. The final page generation can execute on an application server. A program on the application server can analyze the website content and reformat the content to produce a desired print format with an aesthetically pleasing print design. The analysis of the website content can remove website elements that are inconsequential on a hardcopy, such as site navigation and hyperlinks.

Once the analysis is complete and the final page has been generated, the user can select to have the final page printed as a hardcopy of the select website content. Additionally, the user can choose a desired format for printing such as a magazine layout, a book layout, and the like, as described above.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims.

What is claimed is:

1. A method comprising:
providing to a user's computer a web widget that operates as a background process on the user's computer to engage an application server while a website is being browsed on the user's computer;
responsive to engagement by the web widget, by the application server
extracting contents from different pages of a website while the website is being browsed on the user's computer,
transforming the extracted contents into a print format comprising a collection of print sheets to which the extracted contents are allocated and on which the allocated extracted contents are arranged differently than the pages of the web site,
creating a preview representative of the transformed extracted contents, and
transmitting the preview to the user's computer to be represented in a user interface together with the website being browsed by a graphical interface element associated with functions for displaying and printing the preview.

2. A method in accordance with claim 1, wherein the graphical interface element is associated with the web widget.

3. A method in accordance with claim 1, wherein the graphical interface element has an appearance that corresponds to the preview.

4. A method in accordance with claim 1, further comprising:
printing the collection of print sheets on a printer when directed by the user's computer via the graphical interface element.

5. A method in accordance with claim 1, wherein the web widget is a client-side web widget.

6. A method in accordance with claim 1, wherein the providing comprises providing the web widget to the user's computer from a website server that provides the website being browsed on the user's computer.

7. A method in accordance with claim 1, wherein the providing comprises supplying the web widget to the user's computer as a plug-in program operable with an Internet browser resident on the user's computer.

8. A method in accordance with claim 1, wherein the extracting further comprises:
analyzing the contents of the pages of the website via a processor on the application server to identify desirable and undesirable print contents of the website;
excluding the undesirable print contents from the extracted contents via the processor; and
including the desirable print contents in the extracted contents via the processor.

9. A method in accordance with claim 1, wherein the print format is selected from the group consisting of a magazine layout, a newspaper layout, a photo album, a brochure, a book, a booklet, a leaflet, and combinations thereof.

10. A method for promoting printing of website content, the method being carried out by a computer system to perform operations comprising:
providing to a user computer a web widget that operates as a background process on the user's computer to engage the computer system while a website is being browsed on the user computer;
responsive to engagement by the web widget, extracting contents from different pages of a website while the website is being browsed on the user computer and formatting the extracted contents into a print format comprising a collection of print sheets to which the extracted contents are allocated and on which the allocated extracted contents are arranged differently than the pages of the web site; and
providing a preview of the formatted extracted contents to the user computer to be represented in a user interface together with the website being browsed by a graphical interface element associated with functions for displaying and printing the preview.

11. A method in accordance with claim 10, wherein the graphical interface element is associated with the web widget.

12. A system, comprising:
a user computer having a processor and system memory, and machine-executable programming instructions stored in tangible computer-readable media, configured to browse websites;
an application server having a processor with a programming application comprising machine-executable programming instructions stored in tangible computer-readable media, configured to analyze, extract, and reformat contents of websites; and
a web widget executable by the processor of the user computer to engage the application server to extract contents from different pages of a website while the website is being browsed by the user computer, transform the contents extracted from the website being browsed into a print format comprising a collection of print sheets to which the extracted contents are allocated and on which the allocated extracted contents are arranged differently than the pages of the web site, create a preview representative of the transformed extracted contents, and transmit the preview to the user's computer to be represented in a user interface together with the website being browsed by a graphical interface element associated with functions for displaying and printing the preview.

13. A system in accordance with claim 12, wherein the web widget is a client-side web widget that resides on a website server that provides the website to the user computer.

14. A system in accordance with claim 12, wherein the web widget is a client-side web widget including a plug-in program comprising machine-executable programming instructions stored in tangible computer-readable media, resident on the user's computer and operable with an Internet browser on the user computer.

15. A system in accordance with claim 12, wherein the web widget further provides a preview of the reformatted content, accessible via the graphical interface element.

16. The method of claim 1, wherein the web widget automatically engages the application server as the web site is being browsed on the user's computer.

17. The method of claim 1, wherein the providing comprises providing the web widget embedded in content of the website to the user's computer.

* * * * *

UNITED STATES PATENT AND TRADEMARK OFFICE
CERTIFICATE OF CORRECTION

PATENT NO. : 8,861,017 B2  
APPLICATION NO. : 13/501294  
DATED : October 14, 2014  
INVENTOR(S) : Eamonn O'Brien-Strain Page 1 of 1

It is certified that error appears in the above-identified patent and that said Letters Patent is hereby corrected as shown below:

On the Title Page, item (54) and in the Specification, column 1, line 1, delete "FIR" and insert -- FOR --, therefor.

Signed and Sealed this
Twenty-fourth Day of February, 2015

Michelle K. Lee
*Deputy Director of the United States Patent and Trademark Office*